No. 849,483. PATENTED APR. 9, 1907.
M. H. MAGIE & C. N. WINTERS.
MOTOR VEHICLE.
APPLICATION FILED MAR. 22, 1905.
3 SHEETS—SHEET 1.
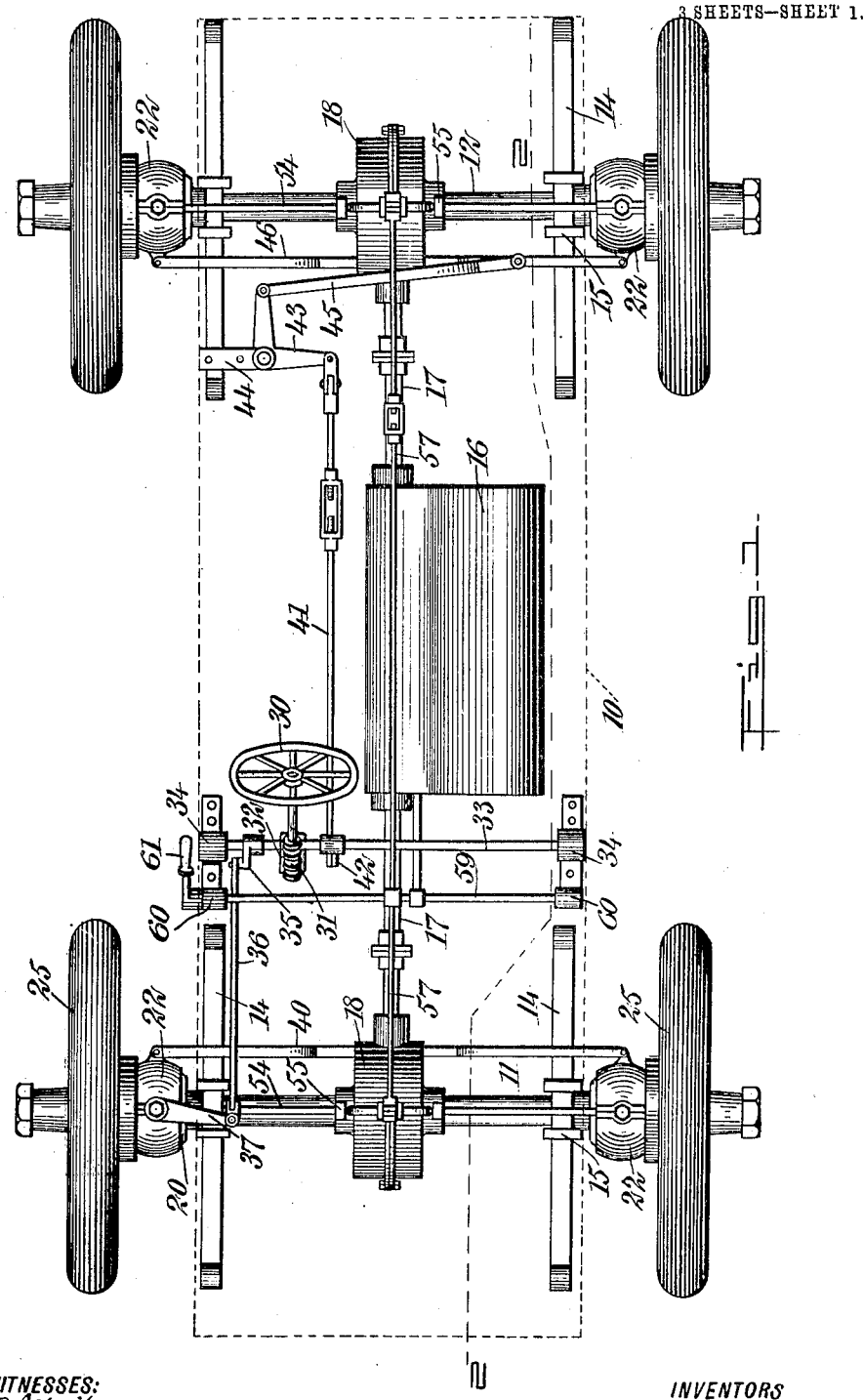
WITNESSES:
C. A. Jarvis.
Isaac B. Owens.
INVENTORS
Morton H. Magie
Charles N. Winters
BY
ATTORNEYS No. 849,483. PATENTED APR. 9, 1907.
M. H. MAGIE & C. N. WINTERS.
MOTOR VEHICLE.
APPLICATION FILED MAR. 22, 1905.

3 SHEETS—SHEET 2.

WITNESSES:
C. A. Jarvis.
Isaac B. Owens.

INVENTORS
Morton H. Magie
Charles N. Winters
BY
Munn
ATTORNEYS

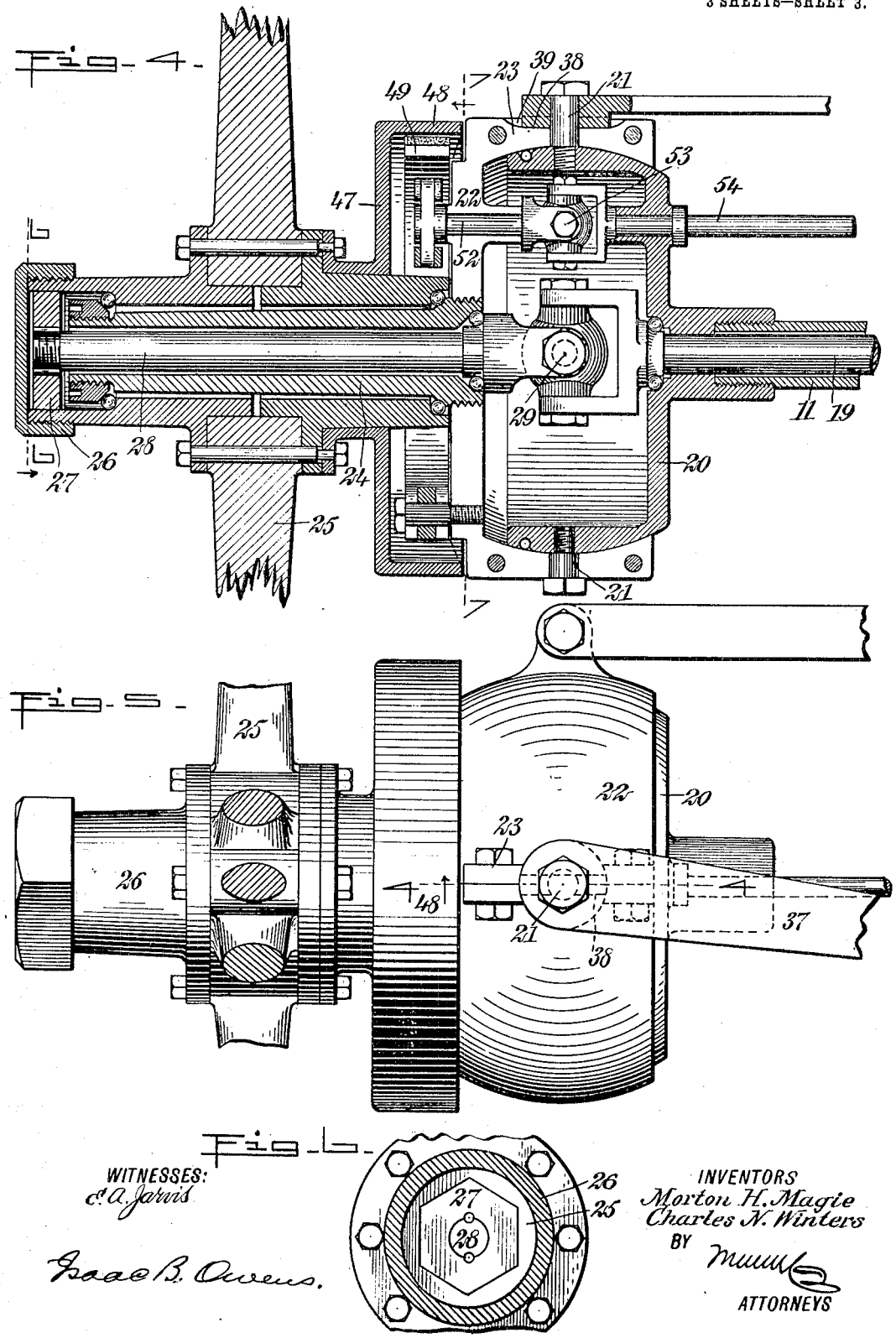

UNITED STATES PATENT OFFICE.

MORTON HOMER MAGIE AND CHARLES NELSON WINTERS, OF BAKERSFIELD, CALIFORNIA.

MOTOR-VEHICLE.

No. 849,483.

Specification of Letters Patent.

Patented April 9, 1907.

Application filed March 22, 1905. Serial No. 251,399.

*To all whom it may concern:*

Be it known that we, MORTON HOMER MAGIE and CHARLES NELSON WINTERS, both citizens of the United States, and residents of Bakersfield, in the county of Kern and State of California, have invented a new and Improved Motor-Vehicle Running and Driving Gear, of which the following is a full, clear, and exact description.
The underlying object of our invention is to provide a motor-vehicle in which the motive power, braking force, and steering action may be applied to all of the four road-wheels of the vehicle. Such a construction is advantageous and important for the reason that it gives the vehicle greater power of traction, prevents skidding, and enables the vehicle to be completely controlled. This end we attain by certain peculiar features of construction and arrangement of parts which will be fully brought out hereinafter and particularly pointed out in the claims.

Reference is to be had to the accompanying drawings, which illustrate as an example one manner of practically embodying our invention, in which drawings like characters of reference indicate like parts in the several views, and in which—

Figure 7:
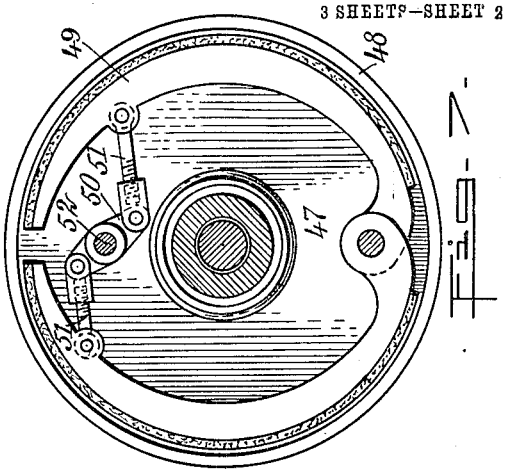
Figure 2:
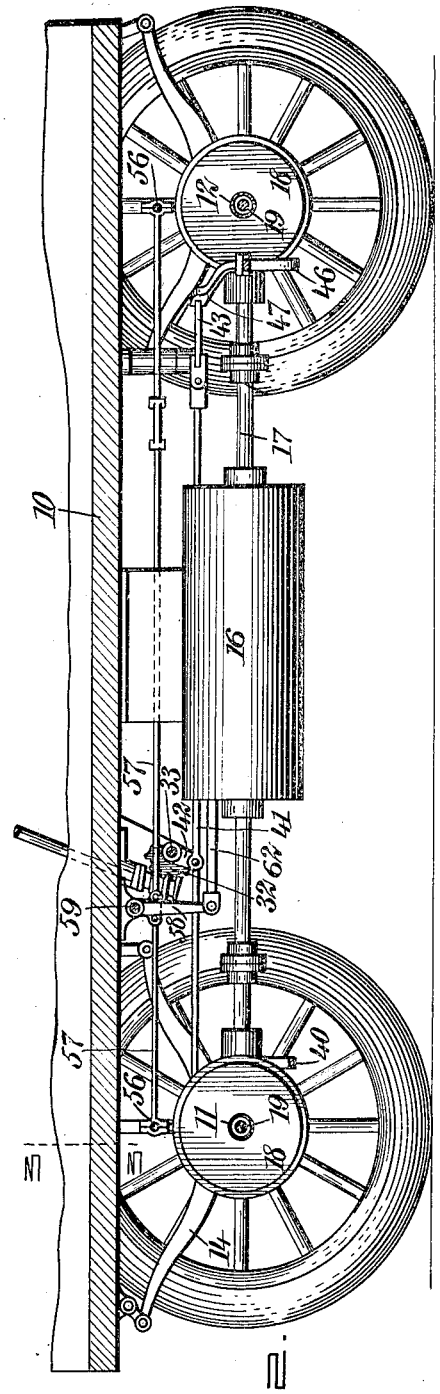
Figure 5:
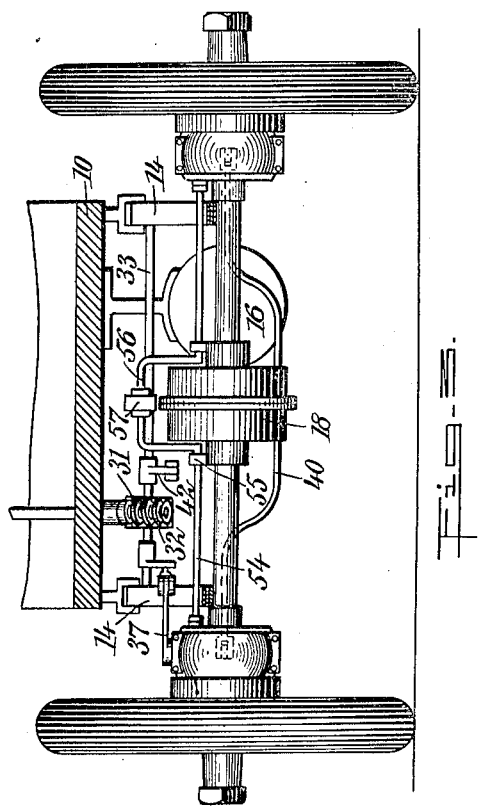

Figure 1 is a plan view of the running and driving gear or chassis of the vehicle. Fig. 2 is a longitudinal section of the same on essentially the line 2 2 of Fig. 1. Fig. 3 is a front elevation with the frame or body of the vehicle in section on the line 3 3 of Fig.
2. Fig. 4 is an enlarged sectional view on essentially the line 4 4 of Fig. 5, showing the steering-knuckles, driving mechanism, and braking devices of one of the wheels of the vehicle. Fig. 5 is a plan view of the same parts. Fig. 6 is a sectional view of the cap on the line 6 6 of Fig. 4, showing the manner of fastening the driving-spindle to the hub of the wheel; and Fig. 7 is a sectional view showing the brake on the line 7 7 of Fig. 4.
As here shown, the invention is applied to automobiles of the type in which the frame or body 10 connects the front and rear axles 11 and 12 through the medium of half-elliptic springs 14. The axles are hollow and non-rotative, being held firmly to the springs by clips 15.

16 indicates the source of motive power, which may be of any desired sort and which is located between the axles 11 and 12. Following ordinary practice this source of power would include an engine and the speed-change or transmission gear. From this source of power driving-shafts 17 pass forward and rearward, respectively, to differential gears contained within differential-gear cases 18, fastened to and forming parts of the hollow axles 11 and 12. Said differential gears connect the driving-shafts 17 with driving-shafts 19, contained within the hollow axles 11 and 12, one in each end portion thereof.

Attached to each end of each axle is a box 20. (Shown best in Figs. 4 and 5.) These boxes carry studs 21, which mount the boxes 22 on the boxes 20, so that the latter boxes may turn or cant around vertical axes independently of the boxes 20 and their permanently-connected parts. As here shown, the boxes 22 are formed in two sections, which are flanged and bolted together, as indicated at 23, and the engaging surfaces of the boxes 20 and 23 are spheriform to permit easy movement of the boxes 22 and yet securely to sustain said boxes. The boxes 23 carry outwardly-projecting tubular journals 24, on which the wheels 25 are suitably mounted. The hubs of said wheels carry caps 26, and fastened in the outer ends of the hubs are nuts 27, which are keyed to the outer ends of the driving-spindles 28. These spindles are revolubly mounted in the tubular journals 24 and are connected by a universal joint 29 with the driving-shafts 19, said universal joints being coincident to the centers of swinging movement of the boxes 22 and their attachments. In this manner all four of the wheels are made traction-wheels, and at the same time all of the wheels are mounted so that they may swing on the supporting-axles, and thus exert a steering influence on the vehicle. This provides for increased traction and stability and for steering by all four wheels of the vehicle, making the steering action far more certain and less dangerous than heretofore.

The steering action may be imparted to the wheels by various devices. We prefer to employ a steering-wheel 30, having a worm 31 in mesh with a worm-toothed sector 32, which is fastened to a shaft 33, rockably mounted in suitable boxes 34 and extending transversely under the bed or body of the vehicle. Said shaft has an arm 35, to which a link 36 is joined, and this link extends forwardly and is articulated to an arm 37, which turns loosely on the stud 21 of the front right-hand box 20. The arm is provided with a key or feather 38, which fits in a corresponding cavity 39, formed in the corresponding box 23, so as to swing said box upon the swinging of the arm 37. The right-hand box 23 is connected by a cross-rod 40 with the left-hand front box 23. The rear wheels are steered through the medium of the rod 41, joined to an arm 42 on the shaft 33 and extending rearward to an elbow-lever 43, which is fulcrumed on a suitable support 44. The elbow-lever 43 is connected by a reach-rod 45 to a cross-rod 46, which is pivoted to the two rear boxes 23. In this manner upon operating the wheel 30 a steering movement is given to all of the four wheels of the vehicle.

Attached to the hub of each wheel at the inner side thereof is a disk 47, having a concentric overhanging flange 48. With the interior walls of these flanges brake-shoes 49 operate. (See Fig. 7.) These shoes are adapted to be expanded into action through the medium of a lever 50, the ends of which are joined by links 51 to the respective shoes and the fulcrum of which is coincident to a rock-shaft 52, mounted in the adjacent box 22. These rock-shafts 52 are connected by universal joints 53 with actuating-shafts 54. The shoes 53 are coincident to the centers of swinging movement of the boxes 23, so that motion may be transmitted from the shaft 54 to the shaft 52 without interfering with the rocking movement of said boxes. The shafts 54 are two in number—one for the front axle and one for the rear axle. Said shafts are mounted in the boxes 20 and also in bearings 55, supported by the differential-gear boxes 18. The shafts 54 have double cranks 56 formed therein intermediate their ends, and these are connected to rods 57. The rods 57 are in turn joined to an arm 58, which is connected to a rock-shaft 59, the rock-shaft extending transversely under the bed or frame 10 of the vehicle and being mounted in bearings 60.

61 indicates a handle for operating the rock-shaft, and, if desired, the arm 58 of the rock-shaft 59 may be connected by a rod 62 with the transmission mechanism to adjust the same, the arrangement being such that when the transmission mechanism is thrown out the brakes are at the same instant applied. It will be seen that by means of this arrangement the braking force is applied directly to the hub of each wheel, thus securing the most efficient braking action and without interfering with the driving or steering actions of the wheels.

It will be apparent from the foregoing description that our invention provides for transforming all of the four wheels of the vehicle into steering-wheels and, in addition, for permitting the braking force to be applied directly to each wheel irrespective of the steering movement thereof. The advantages of this arrangement will be apparent to persons skilled in the art.

Having thus described the preferred embodiment of our invention what we claim as new, and consider ourselves entitled to under the patent law, is—

1. A motor-vehicle having a plurality of road-wheels, means for revolubly mounting the wheels and also for permitting the wheels to be slued to steer the vehicle, means for driving said wheels independently of the sluing movement thereof, a braking member acting directly on the wheels, and means for operating the braking member independently of the sluing movements of the wheels, said means for driving the wheels and said means for applying the braking members thereto, comprising universal joints coincident to the centers of the sluing movement of the wheels.

2. The combination of a supporting member or axle, a driving-shaft revolubly carried therein, a tubular journal, means mounting said journal to swing on said supporting member or axle, a wheel revolubly mounted on the tubular journal, means connecting the driving-shaft with the wheel, said means including a universal joint coincident to the center of swinging movement of the journal, and means for applying a braking member directly to the wheel, said means including movement-transmitting parts having a universal joint coincident to the center of swinging movement of the said journal.

3. The combination of a supporting member or axle, a driving-shaft revolubly mounted thereon, a tubular journal, means for mounting the journal to swing on the supporting member, a wheel revolubly carried on the journal, means connecting the wheel with the driving-shaft and including a universal joint coincident to the center of swinging movement of the journal, means furnishing a braking-surface secured directly to the wheel, a brake-shoe coacting with said surface, and means for operating the brake-shoe, said means including movement-transmitting parts having a universal joint coincident to the center of swinging movement of the journal.

4. The combination of a supporting member or axle, a driving-shaft revolubly mounted therein, a box attached to the supporting member, a second box mounted to swing on the first-named box, a tubular journal carried by the second box, a wheel revolubly mounted on the tubular journal, a spindle extending through the tubular journal and having connection with the wheel, a universal joint connecting the spindle and driving-shaft, said joint being coincident to the center of swinging movement of the second-named box, means forming a braking-surface attached directly to the wheel, a brake-shoe coacting with said means, and devices for operating the brake-shoe, said devices including movement-transmitting parts carried respectively in the boxes, and a universal joint establishing connection between said parts and lying coincident to the center of swinging movement of the second-named box.

5. A motor-vehicle having two hollow axles, each with an intermediately-situated differential-gear case, divided driving-shafts carried on each axle, means connecting the sections of said shafts with the source of motive power, four road-wheels, means for mounting said wheels respectively at the ends of the axles, said means permitting the road-wheels to slue or turn to steer the vehicle, means connecting the driving-shaft sections respectively with the road-wheels to drive the same independently of said turning or sluing movement means for imparting said turning or sluing movement to the wheels, and means for applying a braking element directly to each wheel.

6. A motor-vehicle having two hollow axles, each with an intermediately-situated differential-gear case, divided driving-shafts carried on each axle, means connecting the sections of said shafts with the source of motive power, four road-wheels, means for mounting said wheels respectively at the ends of the axles, said means permitting the road-wheels to slue or turn to steer the vehicle, means connecting the driving-shaft sections respectively with the road-wheels to drive the same independently of said turning or sluing movement, means for imparting said turning or sluing movement to the wheels, means attached to each wheel and forming a braking-surface, a brake-shoe coacting with the braking-surface, and means for operating the shoes.

7. A motor-vehicle having two hollow axles, each with an intermediately-situated differential-gear case, divided driving-shafts carried on each axle, means connecting the sections of said shafts with the source of motive power, four road-wheels, means for mounting said wheels respectively at the ends of the axles, said means permitting the road-wheels to turn or slue to steer the vehicle, means connecting the driving-shaft sections respectively with the road-wheels to drive the same independently of said turning or sluing movement, means for imparting said turning or sluing movement to the wheels, means attached to each wheel and forming a braking-surface, a brake-shoe coacting with the braking-surface and means for operating the shoes, said means comprising movement-transmitting parts with universal joints coincident to the axes of said turning or sluing movements of the road-wheels.

8. The combination of a supporting member, a driving-shaft revolubly carried thereby, a tubular journal, means for mounting the journal to swing on the supporting member, a wheel mounted on the journal, means connecting the wheel with the driving-shaft, said means including a universal joint coincident to the center of the swinging movement of the journal, means forming a braking-surface directly on the wheel, a brake member operating on said surface, and devices for actuating the brake member, said devices including a universal joint coincident to the center of the swinging movement of the journal.

In testimony whereof we have signed our names to this specification in the presence of two subscribing witnesses.

MORTON HOMER MAGIE.
CHARLES NELSON WINTERS.

Witnesses:
W. W. KAYE,
H. W. KLIPSTEIN, Jr.